Feb. 23, 1960 R. E. NEARMAN 2,925,980
MATERIAL HANDLING APPARATUS
Filed Jan. 16, 1959 3 Sheets-Sheet 1

INVENTOR
Richard E. Nearman

BY G. D. O'Brien
Claude Funkhouser
ATTORNEYS

Feb. 23, 1960  R. E. NEARMAN  2,925,980
MATERIAL HANDLING APPARATUS
Filed Jan. 16, 1959  3 Sheets-Sheet 2

INVENTOR
Richard E. Nearman

BY
ATTORNEYS

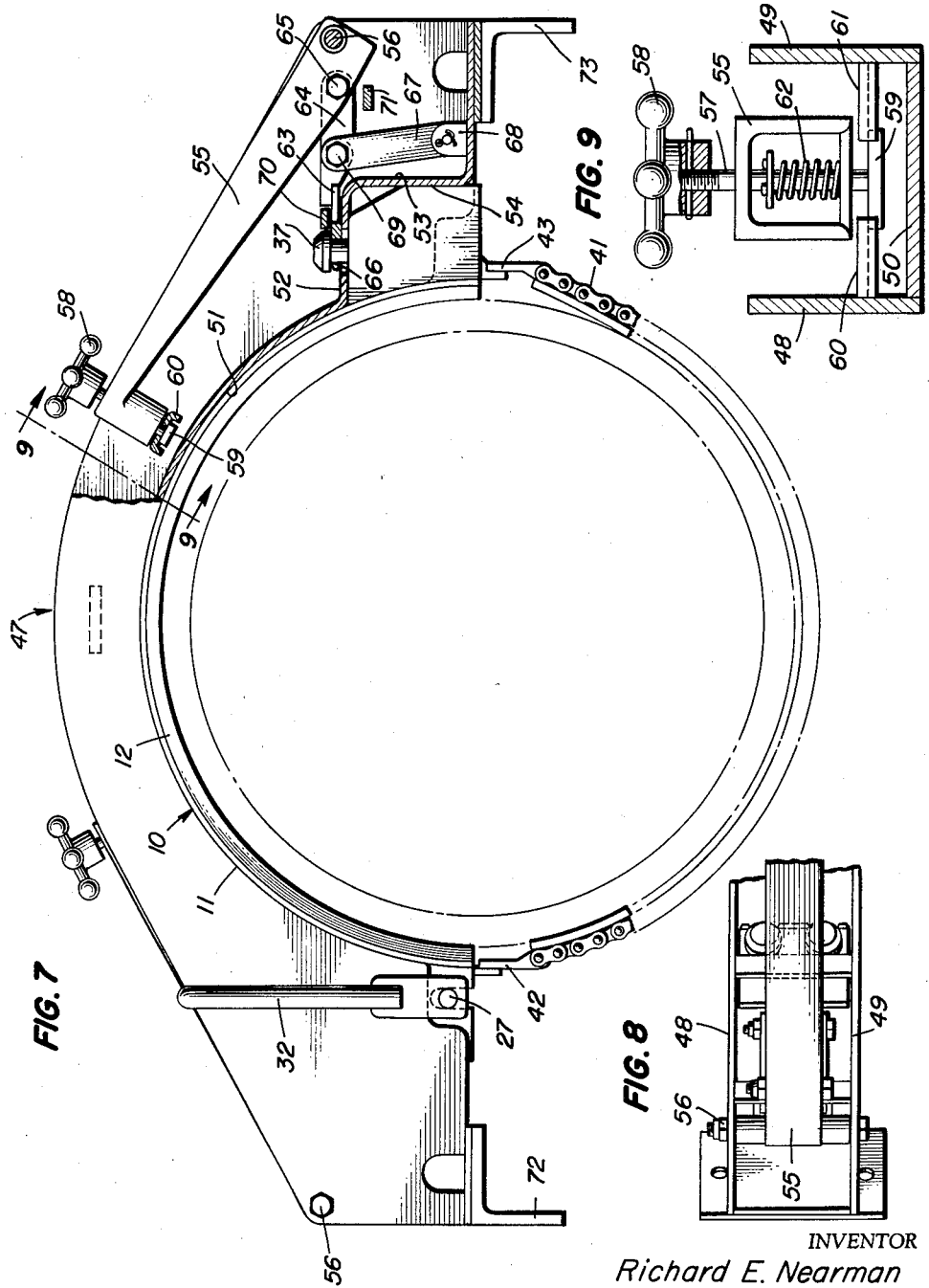

United States Patent Office 2,925,980
Patented Feb. 23, 1960.

2,925,980

MATERIAL HANDLING APPARATUS

Richard E. Nearman, Rockville, Md., assignor to the United States of America as represented by the Secretary of the Navy Application January 16, 1959, Serial No. 787,314

11 Claims. (Cl. 248—316)

The present invention relates generally to apparatus for supporting heavy loads; more particularly it relates to improved material handling apparatus especially designed for supporting aerial missiles or components thereof during assembly or testing operations.

One object of the invention is to provide material handling apparatus that will be positive and safe in operation, so that danger of accidental release of the material being handled, with consequent injury to personnel or damage to such material, will be eliminated.

As another object the invention provides material handling apparatus which incorporates improved latches that may be engaged or released with the utmost facility, even by a worker wearing heavy gloves.

The invention seeks, as still another object, to provide material handling apparatus that may be adjusted after engagement thereof with an article to be supported, so that accidental release due to vibration or shock will be prevented.

Other objects and many of the attendant advantages of this invention will be readily appreciated as the same becomes better understood by reference to the following detailed description when considered in connection with the accompanying drawings wherein:

Fig. 7 is a side elevation, partially in section, showing the material handling apparatus completely assembled and in operative position, an article being supported being shown in broken lines;

Fig. 8 is a detail top plan view showing a portion of the toggle latch on the saddle employed; and Fig. 9 is an enlarged transverse sectional view, on the line 9—9 of Fig. 7.

Briefly, the present invention comprises a strap assembly which consists of a rigid semicircular section and a flexible section, and a saddle which embraces the rigid section and is connected thereto by a pair of toggle latches. Similarly, one end of the flexible section of the strap assembly is connected to one end of the rigid section thereof by a quick release latch, the corresponding opposite ends of the sections being adjustably connected for permitting adjustment of the strap assembly to prevent accidental release of the quick release latch, due to shock or vibration.

Figure 1:
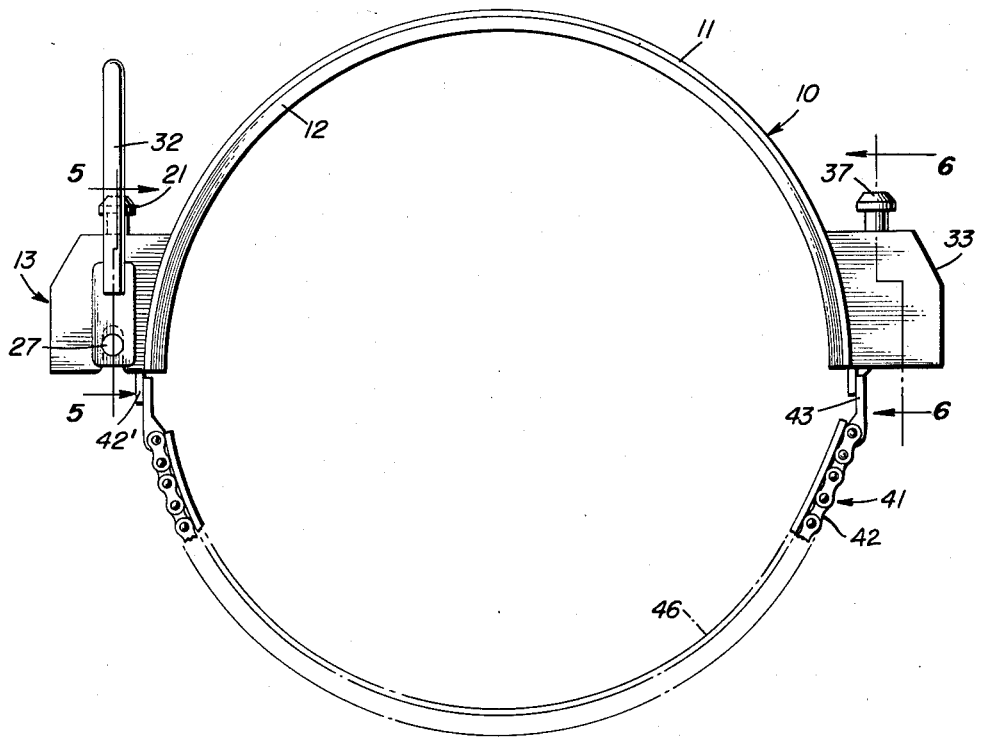
Fig. 1 is a side elevation showing the strap assembly which constitutes a significant part of the invention.
Figure 2:
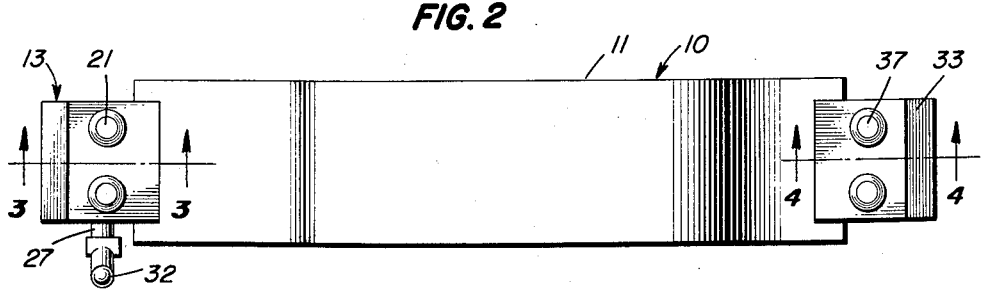
Fig. 2 is a top view of the strap assembly.

Referring to the drawings in more detail and first to Figs. 1 and 2 thereof, the strap assembly is shown generally at 10 and includes a semicircular rigid section 11 which is formed of heavy gauge flat sheet metal. Extending about the inner surface of the section 11 is a liner 12 which is formed of rubber or other cushioning material. At one end of the section 11 on the outer surface thereof is mounted a latch housing 13, an adjustable connector housing being mounted on the opposite end of the section.

Figure 3:
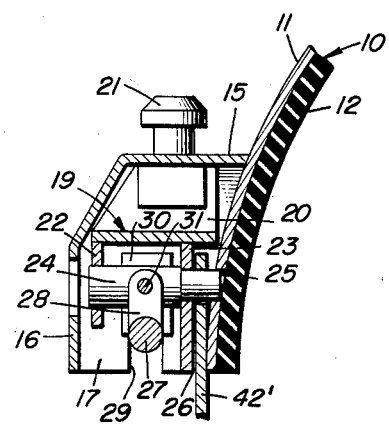
Fig. 3 is an enlarged detail section, on the line 3—3 of Fig. 2.
Figure 5:
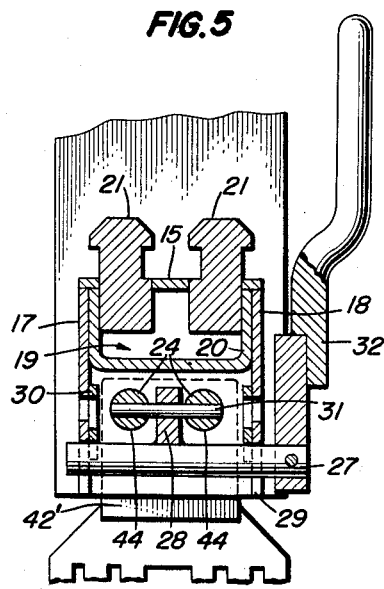
Fig. 5 is an enlarged detail section, on the line 5—5 of Fig. 1.

The latch housing 13 and the latch structure therein are shown in detail in Figs. 3 and 5, and by referring to these views it will be seen that said housing includes a top wall 15, an apertured rear wall 16, and end walls 17 and 18. Within the housing 13 is a latch assembly 19 which includes a U-shaped frame 20. Headed latch bolts 21, for a purpose to be described in more detail hereinafter, are welded to the side walls of the frame 20 and to the top wall 15, and extend above said top wall. The frame 20 includes spaced guides 22 and 23 which are formed with pairs of aligned apertures to receive spaced latch pins 24. Apertures 25 are formed in the wall of the section 11 and are adapted to receive the inner ends of the latch pins in latched positions. It will be seen in Fig. 3 that the latch pins are reduced in diameter near their inner ends to define stop shoulders, for engagement with the guide 23 when said pins are in latching positions. It will also be observed that the guide 23 is spaced from the wall of the section 11 for defining a slot 26.

Movement of the latch pins into and out of latching positions is effected by structure including a crankshaft 27 having a crank 28 thereon. The crankshaft is mounted in aligned slots 29 in the end walls of the housing, said end walls being re-enforced by planes 30. As best seen in Fig. 5, the crank 28 extends between the latch pins 24 and is operatively connected with said pins by a coupling pin 31 which also functions to retain the crankshaft in the slots 29. Secured to one end of the crankshaft 27 is a lever 32. It will now be readily understood that rocking the lever toward or away from the strap assembly 11 will cause the latch pins to move into or out of the slot 26 and into or out of the apertures 25.

Figure 6:
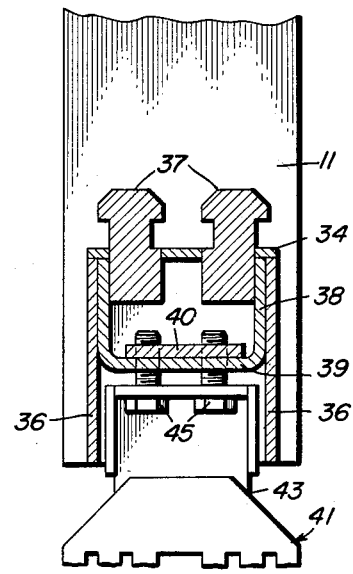
Fig. 6 is an enlarged detail section, on the line 6—6 of Fig. 1.

The adjustable connector housing, mounted on the opposite end of the section 11 for the latch housing 13, is indicated generally at 33 and has a top wall 34, a rear wall 35 and end walls 36. Headed latch bolts 37, similar to the bolts 21, are welded to the top wall 34 and to a U-shaped connector assembly 38 that extends between the side walls 36 within the housing 33. As best seen in Fig. 6, the assembly 38 has a flat bight 39 on which is mounted a re-enforcing plate 40.

Figure 4:
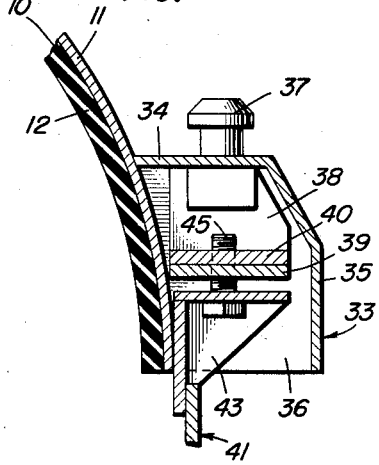
Fig. 4 is an enlarged detail section, on the line 4—4 of Fig. 2.

The flexible section of the strap assembly 10 is shown at 41 in Fig. 1 and includes a band 42, constituted by a plurality of connected links, a keeper plate 42' at one end of the band, and a connector plate 43 at the opposite end of said band, said plate 43 being of inverted L-shape in cross section, as shown in Fig. 4. The keeper plate 42' is provided with a pair of spaced openings 44 of such diameter that the latch pins 24 may pass freely therethrough. Bolts 45 extend through the flat top wall of the connector plate 43, the bight 39, and the re-enforcing plate 40 for adjustably connecting one end of the flexible section to the housing 33 and thus to the section 11. A cushion strip 46, of rubber or other suitable material, is positioned against the inner face of the band 42. The cushion strip and the liner 12 prevent marring of the surface of the object being supported.

The opposite end of the flexible section 41 is connected to the latch housing 13, and thus to the opposite end of the rigid section 11, in the following manner. First, the lever 32 is rocked outwardly (away from the section 11) for moving the latch pins 24 out of the slot 26. Then the flexible section is engaged about an object to be supported, such as a missile component. Following this the keeper plate 42' is moved into the slot 26 until the openings 44 are in alignment with the latch pins 24 and with the apertures 25 in the section 11. The lever 32 is then rocked inwardly for moving the latch pins through said openings 44 and into the apertures 25, when the keeper plate will be securely held in the slot 26.

After the flexible section 41 has been attached to the rigid section 11 in the manner above described, accidental displacement of the latch pins 24 from the keeper plate is prevented by the adjustment of the latch. To effect such adjustment the bolts 45 are tightened in the connector housing 33. Tightening of the bolts 45 applies sufficient friction to the latch pins to prevent any unintended movement thereof in the event that the object being supported does not have sufficient weight to load the said latch pins. Ordinarily the weight of the object being supported would retain the latch pins against displacement, particularly since said pins are in double shear when under load.

When the strap assembly 10 has been secured to the missile component or other object to be supported, it is desirable that said assembly and its load be positioned for easy access so that a testing or similar operation may be carried out. To accomplish such positioning the structure shown in Figs. 7, 8, and 9 is employed. Said structure comprises a saddle which is shown generally at 47. The saddle 47 is of semielliptical contour in side elevation and is U-shape in cross section. It includes side walls 48 and 49 and a bottom wall 50, and is provided with an arcuate central recess 51 to receive the rigid section 11 of the strap assembly 10. The bottom wall 50 is shaped to define the top and side walls 52 and 53, respectively, of receptacles 54 adjacent the ends of the recess 51. Only one of two receptacles 54 is shown in the broken away portion of Fig. 7. The receptacles 54 receive the housings 13 and 33, and the top walls 52 of said receptacles are apertured to receive therethrough the headed latch bolts 21 and 37 on said housings.

Toggle latch structures are positioned in each end portion of the saddle 47, said structures being identical so that a description of one will suffice for both. The latch structure shown in Fig. 7 includes a lever 55 which is inverted U-shape in section and is pivoted on a pin 56 at the end of the saddle. At its free end, as shown in Fig. 9, the lever 55 carries a plunger 57 having a knob 58 on its upper end and a keeper 59 on its lower end. Opposed keeper elements 60 and 61 are mounted on the side walls 48 and 49 and define a slot through which the keeper 59 may pass when it is turned by the knob 58 to a position parallel to said side walls. The knob 58 is depressed, against the compression of a spring 62, and rotated a quarter turn for placing the keeper 59 beneath the keeper elements 60 and 61, when the lever 55 will be held in "safe" latched position.

For retaining the strap assembly 10 within the saddle 47 the toggle latch structure employs a latch plate 63 which is coupled to the lever 55 by a link 64 and a pivot bolt 65. As will be seen in Fig. 7, the pivot bolt 65 is located in close spaced relation to the pin 56 and the plate 63 is engageable under the heads of the bolts 37, said plate being formed with slots 66 for the purpose. For guiding the link 64 and latch plate 63 an idler link 67 is employed, said idler link being mounted in a yoke 68 on the bottom wall 50 and being connected to the link 64 medially thereof by a pivot stud 69. Flat transverse bars 70 and 71 extend between the side walls 48 and 49, the bar 70 being located above the latch plate 63 for preventing upward displacement thereof, and the bar 71 cooperating with the idler link 67 for preventing excessive outward swinging movement of the lever 55.

It will be understood that when the lever 55 is swung upwardly and outwardly, the latch plate 63 will be disengaged from beneath the heads of the latch pins 37, when the strap assembly 10 may be lowered away from the saddle 47.

The saddle 47 may be conveniently supported by the side rails of the frame of a handling dolly, such rails being shown at 72 and 73.

Obviously many modifications and variations of the present invention are possible in the light of the above teachings. It is therefore to be understood that within the scope of the appended claims the invention may be practiced otherwise than as specifically described.

What is claimed is:

1. Material handling apparatus including a strap assembly for engagement with an article to be supported and having a rigid section and a flexible section, a saddle for engagement with a support, said sections surrounding the article to be supported, an adjustable latch connecting the sections of the strap assembly, and means including a toggle latch for releasably connecting the strap assembly with the saddle.

2. Material handling apparatus as recited in claim 1, including additionally means for adjusting the first-mentioned latch after engagement of the sections with the article to be supported.

3. In material handling apparatus, a strap assembly comprising a rigid semicircular section, and flexible section having one end adjustably connected to the rigid section, a keeper plate on the opposite end of the flexible section, a latch housing on the rigid section and having a slot receiving the keeper plate, and means on the housing for retaining the keeper plate in the slot and the sections in latched relation.

4. In material handling apparatus, a strap assembly comprising a rigid semicircular section having apertures near one end thereof, a flexible section, means adjustably connecting one end of the flexible section to the end of the rigid section remote from the end having the apertures, a latch housing on the rigid section and confronting the apertures, said housing having a frame having guides, one of said guides and that portion of the rigid section confronted by the housing defining a slot, latch pins in the guides, a keeper plate on the end of the flexible section remote from said means, said keeper plate having openings and being engageable in the slot, and means for moving the latch pins through the openings in the keeper plate and into the apertures for retaining the section in latched position.

5. Material handling apparatus having a saddle, a strap assembly detachably connected with the saddle and comprising a rigid section and a flexible section, means adjustably connecting one end of the flexible section to one end of the rigid section, a latch housing on the other end of the rigid section and having latch pins and a slot, a keeper plate on the flexible section and engageable in the slot, said plate having openings receiving the pins therethrough, a lever for moving the pins through the slot and through the openings in the keeper plate for retaining the sections in latched position, headed latch bolts on the latch housing and on said means, and toggle latches on the saddle and engageable with the bolts for retaining the strap assembly latched to the saddle.

6. Material handling apparatus as recited in claim 5, wherein said means includes a connector housing having a connector assembly therein, a connector plate on the flexible section, and bolts connecting the connector plate with the connector assembly.

7. Material handling apparatus including a strap assembly for engaging an article to be supported, a saddle for mounting said assembly on a support, and a pair of toggle latches on the saddle and detachably connecting the strap assembly with said saddle.

8. Material handling apparatus including a strap assembly for engaging an article to be supported, said assembly having housings with headed latch bolts thereon, a saddle for mounting the strap assembly on a support, and a pair of toggle latches on the saddle and having latch plates engageable with the headed latch bolts for detachably connecting the strap assembly with said saddle.

9. In material handling apparatus, a saddle, a toggle latch on the saddle and including a lever pivotally connected to the saddle, a latch plate, a link connected to the latch plate, a pivot bolt connecting the link to the lever, an idler link connecting the first-mentioned link to the saddle, transverse bars on the saddle and limiting movement of the latch plate and the idler link for restricting movement of the lever, and means on the lever for normally retaining it in latched position.

10. Material handling apparatus as recited in claim 9, wherein said means comprises a plunger on the free end of the lever, a knob on the plunger, a keeper on the plunger, and keeper elements on the saddle and engageable by the keeper upon depression and partial rotation of the plunger.

11. In material handling apparatus, a strap assembly having a rigid section formed with a pair of spaced apertures at one end thereof, a flexible section having a keeper plate, a latch housing on the rigid section and having a top wall, a rear wall and end walls, latch structure in the housing and secured to the top wall, said latch structure having a frame and spaced guides, the guides being parallel to the rear wall and the guide most remote from said rear wall cooperating with that portion of the rigid section confronted by the housing to define a slot receiving the keeper plate, spaced latch pins in the guides, slots in the end walls of the housing, a crankshaft extending through the slots, a crank on the crankshaft and extending between the pins, means operatively connecting the pins and the crank and retaining the crankshaft in the slots, and a lever connected to the crankshaft, said lever being shiftable for rocking the shaft and moving the pins through the slot to engage in the apertures for retaining the keeper plate in the slot.

References Cited in the file of this patent

UNITED STATES PATENTS 991,192  Battenfeld _____ May 2, 1911